United States Patent
Braly et al.

[11] Patent Number: 5,857,921
[45] Date of Patent: Jan. 12, 1999

[54] GOLF CLUB SHAFTS

[75] Inventors: Joseph M. Braly, Kennett Square, Pa.; Warren K. Braly, Torrington, Conn.

[73] Assignee: FM Precision Golf Manufacturing Corp., Torrington, Conn.

[21] Appl. No.: 652,930

[22] Filed: May 24, 1996

[51] Int. Cl.⁶ .................................................. A63B 53/12
[52] U.S. Cl. ......................................... 473/289; 473/316
[58] Field of Search ................................ 473/287, 289, 473/316, 321, 323

[56] References Cited

U.S. PATENT DOCUMENTS

| | | | |
|---|---|---|---|
| 1,962,804 | 6/1934 | Cassady . | |
| 1,979,430 | 11/1934 | Wright | 72/276 |
| 1,983,074 | 12/1934 | Durell . | |
| 2,126,717 | 8/1938 | Barnhart | 473/316 |
| 3,614,101 | 10/1971 | Hunter | 473/301 |
| 3,809,403 | 5/1974 | Hunter | 473/316 |
| 3,871,649 | 3/1975 | Kilshaw | 473/289 |
| 4,070,022 | 1/1978 | Braly | 473/289 |
| 4,122,593 | 10/1978 | Braly | 29/407.07 |
| 5,022,652 | 6/1991 | Fenton | 473/323 |
| 5,074,555 | 12/1991 | Meredith | 473/323 |
| 5,106,087 | 4/1992 | Simmons | 473/287 |

FOREIGN PATENT DOCUMENTS 385241  12/1932  United Kingdom .

*Primary Examiner*—Sebastiano Passaniti
*Assistant Examiner*—Stephen L. Blau
*Attorney, Agent, or Firm*—Hudak & Shunk Co. L.P.A.

[57] ABSTRACT

A tubular blank for producing golf club shafts comprises a butt section having a uniform cross-sectional configuration along its length, a tip section also having a uniform cross-sectional configuration along its length, and a tapered section interconnecting the butt and tip sections. Metallurgically formed rifling on the interior surface of the blank extends throughout the entirety of the butt, tip and tapered sections. The golf club shafts produced from these blanks have increased strength and stiffness which is a direct result of the interior rifling. A set of golf club shafts preferably is produced from a group of these tubular blanks with each blank of the group having the same length and the same natural frequency. Predetermined portions are then selectively removed from the tip and butt sections. The ultimately produced golf club shafts are frequency matched along a predetermined gradient and each shaft of the set has a predetermined stiffness distribution along its length directly related to the stiffness distribution of the other shafts of the set.

22 Claims, 1 Drawing Sheet

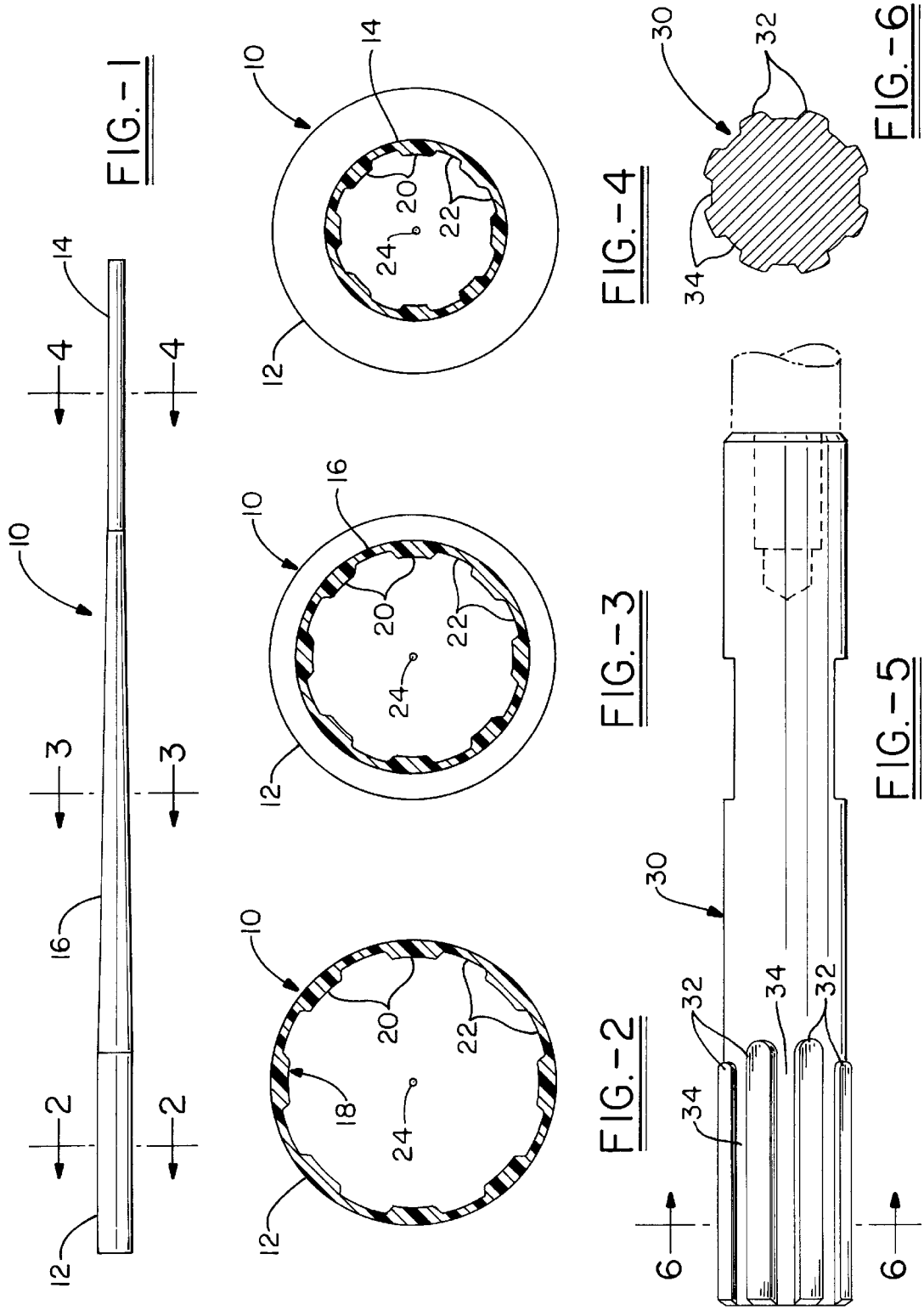

GOLF CLUB SHAFTS

BACKGROUND OF THE INVENTION

The present invention relates to golf club shafts, and more particularly to golf club shafts having rifling on the interior surface thereof and sets of frequency matched golf club shafts where each shaft of the set has a predetermined stiffness distribution along its length directly related to the other shafts of the set.

U.S. Pat. No. 4,070,022, granted Jan. 24, 1978, describes a method of producing frequency matched golf club shafts, and the disclosure of this patent is incorporated herein by reference. Basically, the shafts of the frequency matched set are selected from a inventory of shafts classified as to frequency and length so that the frequencies of the individual shafts of the set fall on a predetermined gradient formed by a plot of shaft frequency and shaft length. Preferably the frequency gradient is a straight line that increases as shaft length decreases, and the frequency increments between successive shaft lengths along the gradient are substantial equal.

U.S. Pat. No. 4,122,593, granted Oct. 31, 1978, also describes a method of producing frequency matched golf club shafts and the disclosure of this patent is incorporated herein by reference. Individual golf club shafts are produced from a oversized universal blank of given length having a known natural frequency within a specified range. After the natural frequency of the blank is determined, selected amounts of shaft length are removed from both the tip and the butt end sections of the blank depending upon (1) the natural frequency of the blank and (2) the desired frequency of the finished golf club shaft. The total amount removed from the blank solely depends upon the length of the shaft being produced. On the other hand, the selected proportional amounts removed from the tip and butt end sections of the blank solely depend upon the desired natural frequency of the shaft. When increased amounts of shaft length are removed from the butt end section the shaft being produced becomes more flexible. Conversely, shafts produced by removing greater amounts from the tip end section produce stiffer shafts.

For example, following the process explained in U.S. Pat. No. 4,122,593, a golf club shaft having a natural frequency of 310 cycles per minute may be produced from oversized universal blank A having a natural frequency of 282 cycles per minute by removing selected amounts from the tip and butt end sections of the blank. A shaft having the same natural frequency of 310 cycles per minute may also be produced from universal blank B having a natural frequency of 262 cycles per minute. However, in order to achieve the target frequency of 310 cycles per minute less length is removed from the butt end section of blank B and more length is removed from the tip end section. In other words, golf club shafts having a target natural frequency and a given length may be produced from a number of different universal blanks each having the same length but a different natural frequency. In each case the total amount of length removed is the same but the proportional amounts removed from the tip and butt end sections are different. While this procedure is useful for producing frequency matched sets of golf club shafts where each shaft in the set has a predetermined frequency that falls on a gradient, the stiffness distribution along the length of each shaft of the set is different and unrelated to the others because the frequency of the universal blanks used to produce the set are different.

Tubular metal golf club shafts are traditionally formed by tube milling techniques well known in the art. Essentially flat metal stock is formed into a tube the seam of which is secured by welding. The formed tube is then pulled over a series of plug mandrels until the desired cross-sectional configuration of the tube is obtained. Once the wall thickness and diameter of the tube are within a desired range the tube is cut into unit lengths, and golf club shafts are produced from these lengths by swaging techniques well known in the art. Wall thickness must be sufficient to impart the necessary strength and stiffness to the golf club shafts but excess wall thickness is avoided because it adversely contributes to the weight of the shaft.

SUMMARY OF THE INVENTION

Accordingly, the primary objective of the present invention is to provide a significantly improved golf club shaft.

Another object of the present invention is a significantly improved golf club shaft having increased strength and stiffness provided by metallurgically formed rifling on the interior surface of the shaft.

Another object of the present invention is a method of making a frequency matched set of golf club shafts where each shaft in the set has a particular target frequency and a predetermined stiffness distribution which is directly related to the other shafts in the set.

In accordance with the present invention, tubular blanks are utilized for producing golf club shafts. Each blank has exterior and interior surfaces along its length and basically comprises a butt section having a uniform cross-sectional configuration along its length and a given outer diameter, and a tip section also having a uniform cross-sectional configuration along its length and a given diameter smaller than the diameter of the butt section. A tapered section interconnects the butt and tip sections. Metallurgically formed rifling on the interior surface of the blank extends throughout the entirety of the butt, tip and tapered sections. These blanks have increased strength and stiffness as a result of the interior rifling.

Preferably the rifling comprises a plurality of alternating longitudinally extending lands and grooves. The longitudinally extending lands are equally spaced apart and the longitudinally extending grooves are also equally spaced apart. The butt and tip end sections are cylindrical and both of the sections have a common central longitudinal axis. The alternating longitudinally extending lands and grooves in the butt and tip sections are parallel to one another and also parallel to the common longitudinal axis. The rifling preferably includes at least eight lands and at least eight grooves extending throughout the entirety of the butt, tip and tapered sections. Also, each longitudinally extending land includes a plateau spaced approximately 0.008 inch from the adjacent longitudinally extending grooves. The rifling is metallurgically formed by reshaping the interior surface of the blank.

The present invention also includes a method of making a tubular blank from which a unique golf club shaft is produced. Initially a tube is formed having a constant cross-section configuration along its length, and then an appropriately contoured plug mandrel is positioned inside the tube, the plug mandrel having alternating parallel longitudinally extending lands and grooves on an outside surface thereof. The tube is drawn over the plug mandrel to reshape the metal material by forming rifling on the inside surface of the tube in the form of a plurality of alternating longitudinally extending parallel lands and grooves corresponding to the lands and grooves on the plug mandrel. The tube is then cut into desired lengths and each length of tube is subjected to a swaging operation to form the tip, butt and interconnecting tapered sections.

Frequency matched sets of golf club shafts are produced from a plurality of oversized tubular blanks wherein each shaft in the set has a predetermined stiffness distribution directly related to the other shafts in the set. In the production of these golf club shafts each of the tubular blanks from which the set is made has substantially the same natural frequency and length. Predetermined portions of length are then removed from the tip end section of each blank with a one-half inch differential of tip end removal between successive blanks of the plurality. Similarly, a predetermined portion of length is removed from the butt end section of each blank to thereby produce a set of golf club shafts with a one-half inch differential of overall length between successive shafts of the plurality.

Preferably the frequency of each tubular blank used to produce the set of golf club shafts has substantially the same natural frequency ±2 cycles per minute. Selected golf club heads are fitted to the frequency matched set of golf club shafts. The frequency difference between successive clubs in the set is the same and the stiffness distribution between successive clubs in the set is directly related.

BRIEF DESCRIPTION OF THE DRAWINGS

Novel features and advantages of the present invention in addition to those discussed above will become apparent to persons skilled in the art from a reading of the following detailed description in conjunction with the accompanying drawings wherein similar reference characters refer to similar parts and in which:

FIG. 1 is a side elevational view of a tubular blank for producing a golf club shaft, according to the present invention;

FIG. 2 is a transverse cross-sectional view of the butt section of the tubular blank taken along line 2—2 of FIG. 1;

FIG. 3 is a transverse cross-sectional view of the tapered section of the tubular blank taken along line 3—3 of FIG. 1;

FIG. 4 is a transverse cross-sectional view of the tip section of the tubular blank taken along line 4—4 of FIG. 1;

FIG. 5 is a side elevational view of a plug mandrel for rifling the interior surface of tubular metal stock in the formation of blanks and golf club shafts manufactured therefrom; and FIG. 6 is a cross-sectional view taken along line 6—6 of FIG. 5.

DETAILED DESCRIPTION OF THE INVENTION

Referring in more particularity to the drawings, FIG. 1 illustrates an oversized tubular blank 10 for producing a golf club shaft having an appearance similar to the blank but a somewhat shorter overall length. Fundamentally, tubular blank 10 has a butt end section 12 and a tip end section 14 with an interconnecting tapered section 16. Rifling 18 is metallurgically formed on the interior surface of the blank, and the rifling extends throughout the entirety of the butt, tip and tapered sections.

Rifling 18 is best shown in the cross-sectional views of FIGS. 2–4. Specifically, the rifling comprises a plurality of alternating longitudinally extending lands 20 and grooves 22. The longitudinally extending lands 20 are equally spaced apart and the longitudinally extending grooves 22 are equally spaced apart.

As is clear from the drawings, the butt and tip sections 12, 14 have a common central longitudinal axis 24 which also extends through tapered section 16. The alternating longitudinally extending lands and grooves in the butt and tip sections are parallel to one another and also parallel to the common central longitudinal axis 24. The rifling in the tapered section is longitudinally extending but generally converges by the angle of taper in the direction from the butt section to the tip section.

Preferably the rifling includes at least eight lands 20 and at least eight grooves 22 extending throughout the entirety of the butt, tip and tapered sections. The rifling imparts strength and stiffness to the tubular blank 10 without adding additional weight.

The tubular blank 10 is produced by tube milling techniques well known in the art. However, during the process of forming the tubular stock from which blank 10 is fabricated, the tubular stock is additionally drawn over a plug mandrel 30 of the type shown in FIG. 5. Plug mandrel 30 has alternating longitudinally extending parallel lands 32 and grooves 34 on an outside surface thereof, preferably at one end. The tubular stock is simply drawn over the plug mandrel to form rifling 18 on the inside surface of the tubular stock, such rifling being in the form of the plurality of alternating longitudinally extending lands and grooves 20, 22. The tubular stock is then cut into desired lengths and each length of tube is subjected to metal swaging techniques to form the butt and tip sections 12, 14 and the interconnecting tapered section 16.

Shafts for golf club irons may be produced from tubular blanks 10 having an overall length of 44 inches. In the case of longer golf club woods, the oversized blanks may have a length of 47 inches. By way of example, a first grouping of nine blanks, each having a natural frequency of 153 cycles per minute and a length of 44 inches, may be selected for producing a set of frequency matched shafts for golf club irons numbered two through nine and a pitching wedge. Similarly a second grouping may be used, having a higher frequency of 160 cycles per minute, for example. One may also start with a third grouping of nine blanks where each blank has a still higher natural frequency of 167 cycles per minute, for example. In each of these groupings the overall length of each blank is 44 inches; the butt section 12 9 inches; the tip section 14 11 inches; and the tapered section 16 24 inches. In each of these three examples, a similar set of frequency matched shafts may be produced through selective removal of blank length from the butt and tip sections. With the first grouping of 153 cycles per minute, more length is removed from the tip section when producing a given shaft in comparison to the second and third groupings of 160 cycles per minute and 167 cycles per minute. Similarly, with the second grouping of 160 cycles per minute more length is removed from the tip section when producing a given shaft in comparison to the third grouping of 167 cycles per minute.

In each of these examples the same frequency matched set of shafts is produced but the stiffness distribution in each set is different. The shafts of the first set produced from the 153 cycles per minute blanks have shorter tip sections and are therefore tip stiff. The stiffness distribution in each shaft of this set has a higher kick point spaced away from the tip in comparison to the second and third sets. The third set made from the 167 cycles per minute blanks has the longest tip sections and a stiffness distribution which provides the lowest kick point. In each set the stiffness distribution in each shaft is predetermined and related to the other shafts in the set. However, even though each set is frequency matched and the corresponding shafts in each set have the same natural frequency, the feel of each set is different. Frequency is timing and stiffness distribution is feel.

Accordingly, as is readily evident from the above examples, once the desired frequency of the individual shafts of a set is determined, the frequency of the tubular blanks 10 used to produce the set is selected depending upon the desired stiffness distribution. If a high kick point is desired, blanks having a relatively low natural frequency are selected. When the tip sections are cut to produce the shafts from these blanks, relatively more length is removed from the tip section thereby making the shaft tip stiff and producing a higher kick point. Conversely, when a low kick point is desired, blanks having a relatively high natural frequency are selected. When the tip sections of these blanks are cut to produce the shafts relatively less length is removed from the tip section making the shaft less tip stiff and thereby producing a lower kick point. Ultimately the butt sections are cut to produce the finished shaft lengths.

The same procedures are utilized when producing shafts for golf club woods from the longer 47 inch blanks.

Accordingly, after the decision is made concerning the natural frequency of the individual shafts, several sets may be made with varying stiffness distributions such as high, low and intermediate kick points. Actual use may then be employed in deciding upon the desired stiffness distribution. A lower kick point produces a golf club shaft which is relatively more flexible at the lower end of the shaft near the tip section. This produces more loft on the club head and therefore a higher loft on the trajectory of the golf ball. Conversely, a higher kick point produces less loft on the golf club head and a lower golf ball trajectory. In turn, this produces less back spin on the ball.

What is claimed is:

1. A golf club shaft, comprising; a tubular blank having a continuous exterior surface, and an interior surface along its length, a butt section having a given outer diameter, a tip section having a given outer diameter smaller than the outer diameter of the butt section, a tapered section interconnecting the butt and tip sections, and metallurgically formed rifling on the interior surface of the blank extending throughout the entirety of the butt, tip and tapered sections, said metallurgically formed rifling comprising a plurality of alternating longitudinally extending lands and grooves wherein the depth of said grooves does not exceed the widths of said lands, and wherein the lands and grooves in the tip section are parallel to each other and the lands and grooves in the butt section are parallel to each other.

2. A golf club shaft as in claim 1 wherein the longitudinally extending lands are equally spaced apart and the longitudinally extending grooves are equally spaced apart at any given diameter.

3. A golf club shaft as in claim 2 wherein the butt and tip sections have a common central longitudinal axis and wherein the alternating longitudinally extending lands and grooves in the butt and tip sections are parallel to the common central longitudinal axis.

4. A golf club shaft as in claim 1 wherein the metallurgically formed rifling includes at least eight lands and at least eight grooves extending throughout the entirety of the butt, tip and tapered sections.

5. A golf club shaft as in claim 1 wherein each longitudinally extending land includes a plateau spaced approximately 0.008 inch from the adjacent longitudinally extending grooves.

6. A golf club shaft as set forth in claim 1, wherein said exterior surface is smooth and substantially uninterrupted.

7. A method of making a tubular blank from which a golf club shaft is produced comprising the steps of;

forming a tube having a constant cross-sectional configuration along its length, positioning a plug mandrel inside the tube, the plug mandrel having alternating parallel longitudinally extending lands and grooves on an outside surface thereof, drawing the tube over the plug mandrel to metallurgically form rifling on the inside surface of the tube in the form of a plurality of alternating longitudinally extending parallel lands and grooves corresponding to the lands and grooves on the plug mandrel, cutting the tube into desired lengths, and swaging each length of tube to form tip and butt sections and an interconnecting tapered section, the lands and grooves of said butt section being parallel to each other, and the lands and grooves of said tip section being parallel to each other, and said tip section having a diameter smaller than the diameter of the butt section.

8. A method of producing a frequency matched set of golf club shafts from a plurality of oversized tubular blanks, each shaft in the set having a stiffness distribution directly related to the stiffness distribution of the other shafts in the set such that each successive shorter shaft has an increased stiffness along a predetermined gradient, each blank having a tip end section and a butt end section and an intermediate tapered section, the method comprising the steps of;

selecting a plurality of oversized blanks equal in number to the number of shafts in the set, each blank having substantially the same natural frequency and length, each blank having metallurgically formed rifling to define a plurality of alternating longitudinally extending parallel lands and grooves on an interior surface of said tip section and of said butt section, removing a predetermined portion of length from the rifled tip end section of each blank and a constant additional length differential of tip end removal between said successive blanks of the plurality of said blanks to produce a set of golf club shafts with said constant length differential of overall length between successive shafts of the set.

9. A method as in claim 8, wherein each of the oversized tubular blanks of the plurality selected has substantially the same natural frequency ±two cycles per minute, and removing a predetermined portion of constant length from the butt end section of each blank.

10. A method as in claim 8 including the step of fitting selected golf club heads to the set of golf club shafts.

11. A method according to claim 8, wherein said constant length is one half inch.

12. A method of producing a set of matched golf club shafts, comprising the steps of:

forming a plurality of metal tubes and cutting each said tube to a predetermined length, forming rifling on the interior surface of said metal tube extending throughout the length thereof, working said metal tubes to form a butt section having a given outer diameter and a plurality of alternating, longitudinally extending, parallel lands and grooves on the interior surface, a tip section having a given outer diameter smaller than said butt section diameter and having a plurality of alternating, longitudinally extending, parallel lands and grooves on the interior surface, and a tapered section joining said butt section and said tip section, to form a plurality of blanks;

determining the stiffness of said blanks by measuring the natural frequency thereof and selecting a set of blanks having matched natural frequencies;

forming successive blanks in said set by removing an amount from the tip section of each blank of a set of blanks, the removed amount increasing for each said successive blank by a constant increment such that said resulting set of shafts includes members varying in length by said constant increment so that said set of said successive length shafts represents a set of golf club shafts having matched frequencies along a predetermined gradient.

13. A method according to claim 12, wherein said predetermined blank length is 44 inches and said tapered section is 24 inches.

14. A method according to claim 12, wherein prior to working said tubes have a constant outer diameter, and removing a predetermined length from the butt section of each blank of said set of blanks, said removed butt length being constant for each successive blank in the set.

15. A method according to claim 12, wherein prior to working said tubes have a constant outer diameter, and wherein each blank used to produce said set of golf club shafts has substantially the same matched natural frequency of plus or minus two cycles per minute.

16. A method according to claim 15, wherein each shaft of said set of golf club shafts has a predetermined kick point.

17. A set of frequency matched shafts, comprising;
a plurality of shafts varying in successive lengths by a constant increment and each comprising a butt section having a continuous exterior surface of a given outer diameter and having a plurality of alternating, longitudinally extending, parallel lands and grooves on an interior surface, a tip section having a continuous exterior surface of a given outer diameter smaller than said butt section diameter and having a plurality of alternating, longitudinally extending, parallel lands and grooves on an interior surface, and a tapered section joining said tip section and said butt section, the butt section of each shaft of said set being a constant length, the tip section of each shaft varying in length successively from the prior length shaft in said set by said constant increment.

18. A set of frequency matched shafts as set forth in claim 17, wherein said tapered section has a gradually changing diameter between said tip section and said butt section.

19. A golf club shaft, comprising:
a tubular blank having a continuous cylindrical exterior surface, and an interior surface, a butt section having a given outer diameter, a tip section having a given outer diameter smaller than the outer diameter of the butt section, a tapered section interconnecting the butt and tip sections, and metallurgically formed rifling comprising lands and grooves on the interior surface of the blank extending throughout the entirety of said butt, tip and tapered sections, said lands and grooves in said butt section being parallel to each other, and said lands and grooves in said tip section being parallel to each other.

20. A golf club shaft according to claim 19, wherein the butt and tip sections have a common central longitudinal axis and wherein the alternating longitudinally extending lands and grooves in the butt and tip sections are parallel to the common central longitudinal axis.

21. A golf club shaft according to claim 20, wherein the longitudinally extending lands are equally spaced apart and the longitudinally extending grooves are equally spaced apart at any given diameter.

22. A golf club shaft according to claim 20, wherein the metallurgically formed rifling includes at least eight lands and at least eight grooves extending throughout the entirety of the butt, tip and tapered sections.

* * * * *